United States Patent [19]

Lupis

[11] 4,283,135
[45] Aug. 11, 1981

[54] CLOSE-UP PHOTOGRAPHY AID

[76] Inventor: Ben Lupis, 3191 Shore Rd., Oceanside, N.Y. 11572

[21] Appl. No.: 90,867

[22] Filed: Nov. 2, 1979

[51] Int. Cl.³ ............................................. G03B 17/56
[52] U.S. Cl. ........................................ 354/293; 354/80
[58] Field of Search ............................... 354/290–293, 354/80–82

[56] References Cited

U.S. PATENT DOCUMENTS

| | | | |
|---|---|---|---|
| 2,599,269 | 6/1952 | Markle | 354/80 |
| 3,898,683 | 8/1975 | Breads | 354/292 |
| 4,091,402 | 5/1978 | Siegel | 354/293 |

*Primary Examiner*—John Gonzales
*Attorney, Agent, or Firm*—Richard L. Miller

[57] ABSTRACT

A photography accessory for taking close-up photographs; the accessory including a base frame made from several arms pivoted together, a camera being mounted on one arm while a photographic subject along with possibly a background panel and/or light reflectors and other equipment being supported on any other of the arms.

2 Claims, 5 Drawing Figures

U.S. Patent           Aug. 11, 1981           4,283,135
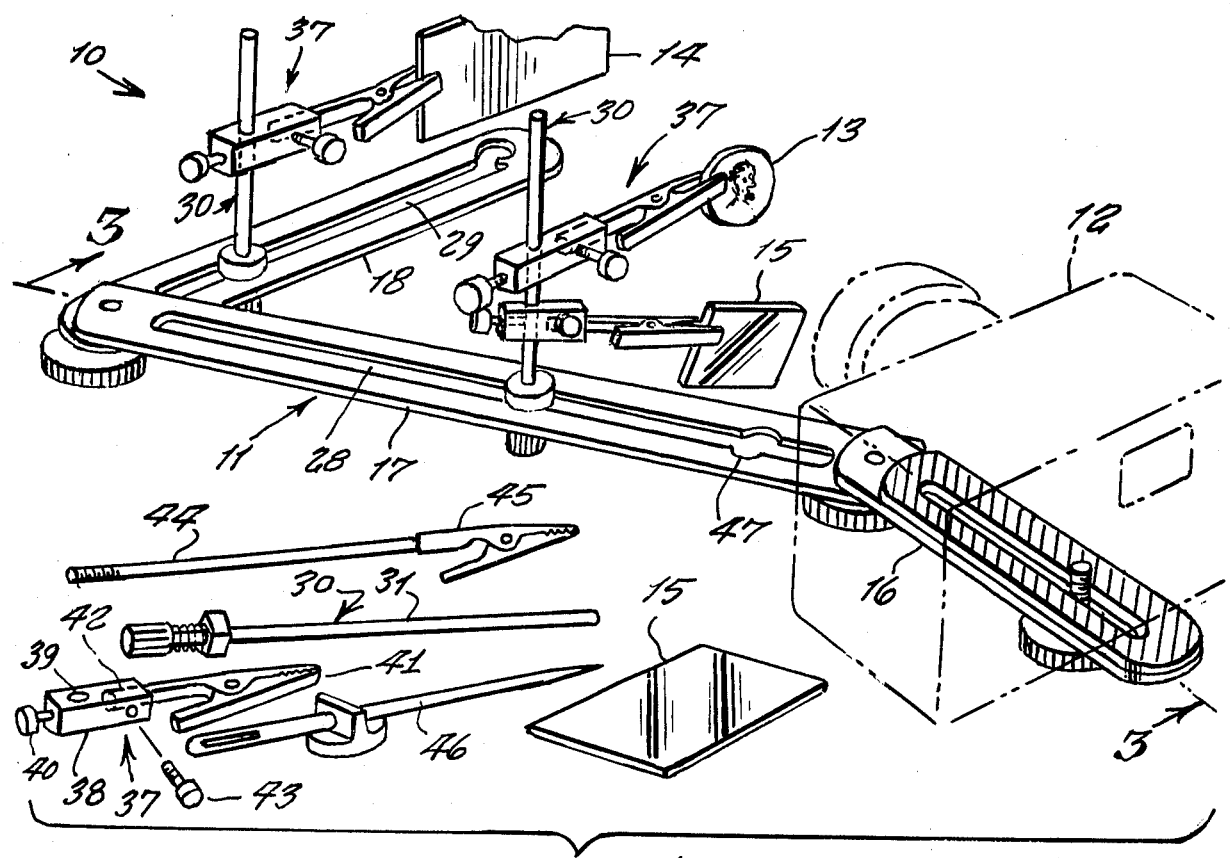
Fig. 1
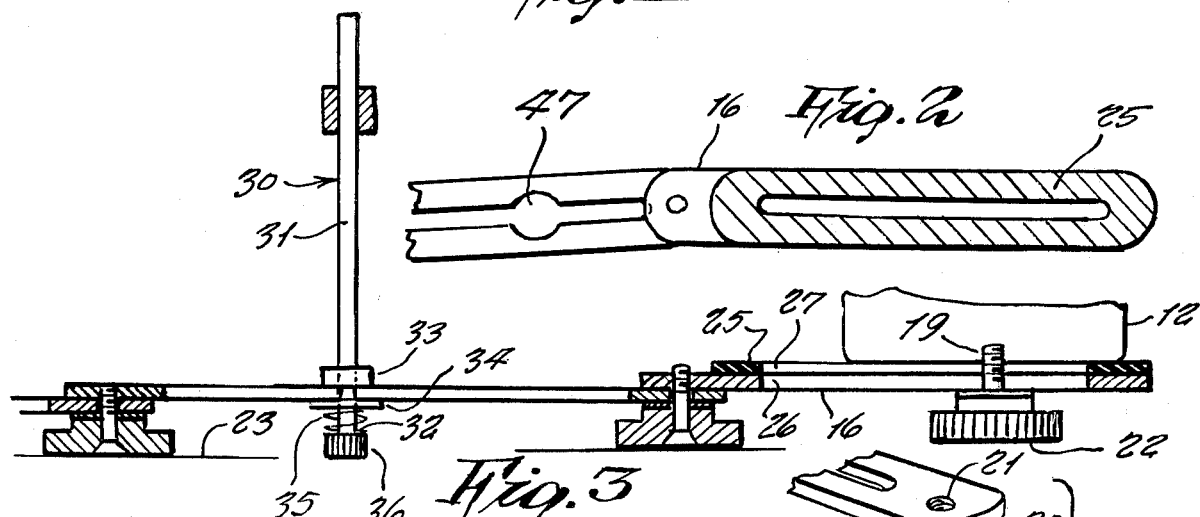
Fig. 2
Fig. 3
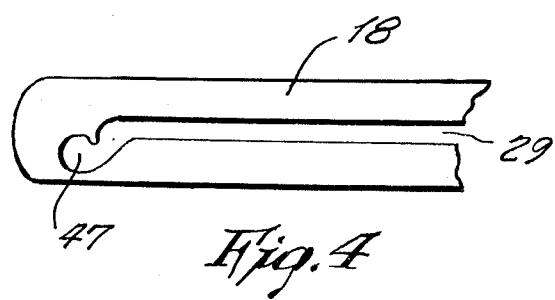
Fig. 4
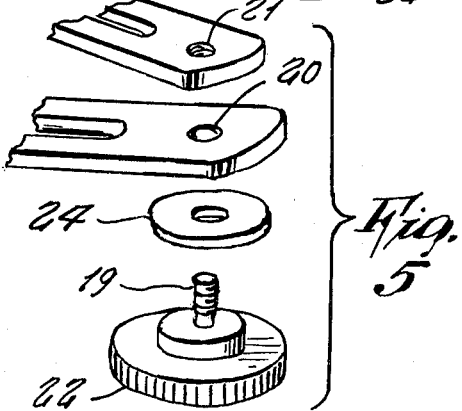
Fig. 5

CLOSE-UP PHOTOGRAPHY AID

BACKGROUND OF THE INVENTION

This invention relates generally to photographing equipment. More specifically it relates to photography accessories.

It is well known that many photographers are interested in taking close-up pictures of various objects such as small insects, butterfly wings, coins, postage stamps, and other small detailed objects, and are obliged to erect various make shift props for supporting and illuminating or shading the subject when making the exposure.

SUMMARY OF THE INVENTION

Accordingly it is a principal object of the present invention to provide a photography accessory for supporting the subject and camera, along with any other extra equipment such as a background panel, light reflectors or the like.

Another object is to provide a close-up photography aid which is completely adjustable so that the positioning of all the equipment may be varied as wished so that any kind of photograph effect may be achieved.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The FIGS. on the drawings are briefly described as follows:

FIG. 1 is a perspective view of components of the invention, showing some of them assembled together for use to micro photograph a small object, such as a coin.

FIG. 2 is a fragmentary top view of part of the assembled structure shown in FIG. 1.

FIG. 3 is a cross sectional view on line 3—3 of FIG. 1.

FIG. 4 is a top view of one end end member of FIG. 1.

FIG. 5 is an exploded view of one of the joints of the assembly shown in FIG. 1.

DETAILED DESCRIPTION OF PREFERRED EMBODIMENT

Referring now to the drawing in greater detail, the reference numeral 10 represents a close-up photography aid according to the present invention, wherein there is a base frame 11 upon which a camera 12, any kind of subject 13, a background panel 14 and reflectors 15 and the like can be adjustably supported.

The base frame is comprised of a plurality of arms 16, 17 and 18 that are pivotally attached together by means of screws 19 received in a clearance hole 20 at one end of one arm and a threaded hole 21 at another arm. Each screw includes an enlarged flat head 22 so that it can rest upon a supporting surface 23. A washer 24 fits also around the screw.

One arm 16 includes a rubber friction pad 25 adhered to its upper side, so that the camera may rest thereupon. A screw 19 extends upwardly through a slot 26 of the arm and a slot 27 of the pad so as to be slidably adjusted therein for fastening to the underside of the camera. Arm 17 has a slot 28, and the arm 18 has a slot 29 in which posts 30 are slidably adjustable in position. Each post comprises a rod 31 screw threaded at one end 32, and a nut 33 is fitted on the thread inner end. In mounting the post on the arm, it is inserted in the slot 28 or 29 downwardly so that the nut 33 rests on top of the arm. A washer 34 is then placed on a lower end of the post, followed by a compression coil spring 35 and nut 36, as shown in FIG. 2, so the post stands rigidly upright.

A clamp 37 is adjustably securable on the post so that the clamp can hold the subject, reflector or background panel. The clamp includes a block 38 having hole 39 for fitting on the post. A set screw 40 locks the block on the post. An alligator-type clip 41 is rotatably, removably, supported in a hole 42 in the block and is locked in selected rotational position by a set screw 43.

Alternately another rod 44 is receivable in hole 42 so as to provide a different plane for a clip 45 on the end of the rod. In addition a needle 46 may be held in the alligator clip so that insects or other specimens may be impaled and supported on the needle point.

Alternately the nuts 33 and 36 are fitted together with the washer 34 and spring 35 on the rod 44 so as to form a post with upright clip.

It is to be noted that each slot 28 and 29 includes an enlarged rounded opening 47 along its length so to allow the nut 36, therethrough, and thus not require disassembly of the nut 36 washer 34 and spring 35 every time that a post is mounted or dismounted from the frame.

In addition to aiding photographing small objects the close-up photography aid is also especially useful for copying slides.

This may be accomplished by substituting a slide for coin 13 in FIG. 1 and supplying an appropriate amount of light from behind. This is possible because objects being photographed are held a fixed distance from the camera by the close-up photography aid.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A close-up photography aid, comprising in combination, a frame having a plurality of elongated flat arms, a plurality of screws for pivoting together adjacent ends of said plurality of arms, each of said plurality of screws having an enlarged flat head for resting upon a supporting surface, each of said plurality of arms having an elongate slot along a portion of the length thereof, and an enlarged circular opening along said slot of two of said arms; two posts receivable through said two enlarged circular openings and each being adjustably slidable along the length of a respective one of said two arms; means for adjustably mounting said two posts to their respective arms in which they are mounted; and means affixed to said two posts for mounting thereon photographic equipment.

2. The close-up photography aid according to claim 1, wherein there are three of said elongated flat arms, one of said arms having means for adjustably mounting along its respective slot photographic equipment, said one arm having a pad adhered upon the top surface thereof.

* * * * *